(12) United States Patent
Fukuda

(10) Patent No.: US 11,590,617 B2
(45) Date of Patent: Feb. 28, 2023

(54) MACHINE TOOL

(71) Applicant: KIWA MACHINERY CO., LTD., Nabari (JP)

(72) Inventor: Shinichi Fukuda, Nabari (JP)

(73) Assignee: KIWA MACHINERY CO., LTD., Nabari (JP)

(*) Notice: Subject to any disclaimer, the term of this patent is extended or adjusted under 35 U.S.C. 154(b) by 437 days.

(21) Appl. No.: 16/631,613

(22) PCT Filed: Jul. 18, 2017

(86) PCT No.: PCT/JP2017/025980
§ 371 (c)(1),
(2) Date: Jan. 16, 2020

(87) PCT Pub. No.: WO2019/016871
PCT Pub. Date: Jan. 24, 2019

(65) Prior Publication Data
US 2020/0147736 A1  May 14, 2020

(51) Int. Cl.
*B23Q 1/25* (2006.01)
*B23Q 11/08* (2006.01)

(52) U.S. Cl.
CPC .............. *B23Q 1/25* (2013.01); *B23Q 11/08* (2013.01)

(58) Field of Classification Search
CPC ............. B23Q 1/25; B23Q 11/08; B23Q 1/66
(Continued)

(56) References Cited

U.S. PATENT DOCUMENTS

| 6,082,939 A * | 7/2000 | Nakashima | B23Q 1/58 409/134 |
| 6,296,599 B1 * | 10/2001 | Staiger | B23Q 7/06 409/134 |

(Continued)

FOREIGN PATENT DOCUMENTS

| DE | 101 19 175 A1 | 10/2002 |
| EP | 2 926 948 A1 | 10/2015 |

(Continued)

OTHER PUBLICATIONS

International Search Report dated Sep. 5, 2017, issued in counterpart International Application No. PCT/JP2017/025980 (2 pages).
(Continued)

*Primary Examiner* — Joseph J Hail
*Assistant Examiner* — Shantese L McDonald
(74) *Attorney, Agent, or Firm* — WHDA, LLP

(57) ABSTRACT

According to the present invention, the operating rate of a machine tool can be increased. Solution is made by a machine tool including a processing chamber surrounded by cover walls to perform processing of a workpiece to be processed, an equerre a part of which is arranged inside the processing chamber, the equerre fixing the workpiece, an opening arranged at a part of the cover walls for access to an inside of the processing chamber, and shutter doors movable between open positions where opening of the opening is performed so that the inside of the processing chamber communicates with an outside of the processing chamber, and closed positions where closing of the opening is performed so that the inside of the processing chamber is isolated from the outside of the processing chamber.

8 Claims, 10 Drawing Sheets

(58) Field of Classification Search
USPC .......................................... 269/309, 311, 312
See application file for complete search history.

(56) References Cited

U.S. PATENT DOCUMENTS

| | | | |
|---|---|---|---|
| 6,752,573 B2 * | 6/2004 | Haller .................. | B23Q 1/4828 |
| | | | 409/27 |
| 9,539,688 B2 * | 1/2017 | Suzuki ..................... | B23Q 1/66 |
| 2010/0018836 A1 | 1/2010 | Kikkawa et al. | |
| 2015/0196976 A1 * | 7/2015 | Doettling ........... | B23Q 11/0891 |
| | | | 219/121.85 |
| 2015/0367472 A1 | 12/2015 | Suzuki et al. | |

FOREIGN PATENT DOCUMENTS

| | | |
|---|---|---|
| JP | 63-13640 U | 1/1988 |
| JP | 2004-142046 A | 5/2004 |
| WO | 2008/029486 A1 | 3/2008 |
| WO | 2014/002173 A1 | 1/2014 |

OTHER PUBLICATIONS

International Preliminary Report on Patentability (Form PCT/IB/373) issued in counterpart International Application No. PCT/JP2017/025980 dated Jan. 21, 2020, with Form PCT/ISA/237 (11 pages).

* cited by examiner

MACHINE TOOL

TECHNICAL FIELD

The present invention relates to a machine tool that can, during processing of a workpiece, prepare for processing of other workpieces.

BACKGROUND ART

Conventionally, in a machine tool such as a machining center, a processing chamber is surrounded by wall surfaces, so that a liquid coolant, which is a cutting oil, is not scattered to the surroundings. FIG. 8 is a diagram illustrating a conventional machine tool. The four sides of a machining center 50, which is a machine tool, are covered by wall surfaces 52, and, a processing chamber 51 inside the machining center 50 is isolated from the outside. A fixed base 56 is arranged inside the processing chamber 51. An index table 55, which can be rotated and positioned about an axis in the vertical direction with respect to the fixed base 56, is arranged on the fixed base 56. An equerre 53 is arranged on the index table 55. A workpiece 54 to be processed is attached to the equerre 53. The equerre 53 is rotatable along the circumference of the axis in the vertical direction of the fixed base according to the rotation of the index table 55. The index table 55 is rotated, so that the workpiece 54 attached to the equerre 53 faces the direction of a spindle 58 to which a tool is attached. The spindle 58 performs processing of a surface of the workpiece 54 facing that direction. An opening for accessing the inside of the processing chamber 51 for replacement of the workpiece 54 is arranged at a part of the wall surface 52, and a shutter door 57 for closing this opening is arranged at the opening. Accordingly, access to the equerre 53 of the machining center 50 is enabled, and scattering of the liquid coolant to the surroundings of the machining center 50 is prevented.

SUMMARY OF INVENTION

Technical Problem

In the case of this conventional machining center 50, when performing processing preparation such as exchange of the workpiece 54, it is necessary to stop an apparatus once, to open the shutter door 57, and to access the equerre 53, so that the liquid coolant is not scattered to the surroundings. That is, since it is necessary to stop the apparatus at the time of processing preparation of the workpiece 54, a stopped state during which processing cannot be performed occurs between each working process of the workpiece 54. Then, since the operating rate of the machining center 50 is decreased due to stoppage of the apparatus at the time of processing preparation of the workpiece 54, there is a problem that the processing preparation time for the workpiece 54 during which processing is not being performed is included in the total processing time for one workpiece, and the total working time becomes long.

Accordingly, it is preferable that access to the equerre 53 and the workpiece 54 is enabled, without stopping the apparatus even at the time of processing. Here, when it is assumed that two or more workpieces are processed in parallel in one machining center 50, at the time of processing of one work, the other workpiece can be exchanged, the operating rate of the machining center 50 can be improved, the operating rate of the machining center 50 can be made to be 100% in terms of the processing of a plurality of workpieces, and the substantial processing time of each workpiece can be considered as the total processing time.

Solution to Problem

A solution is achieved by a machine tool including a processing chamber surrounded by cover walls to perform processing of a workpiece to be processed, an equerre, a part of the equerre being arranged inside the processing chamber, the equerre fixing the workpiece, an opening arranged in a part of the cover walls for access to an inside of the processing chamber, and shutter doors movable between open positions where opening of the opening is performed so that the inside of the processing chamber communicates with an outside of the processing chamber, and closed positions where closing of the opening is performed so that the inside of the processing chamber is isolated from the outside of the processing chamber, wherein a part of the equerre projects from the opening to the outside of the processing chamber, and the closing is achieved when the shutter doors perform contact with the equerre in the closed positions.

Advantageous Effects of Invention

According to the present invention, the operating rate of a machine tool car be increased.

DESCRIPTION OF EMBODIMENTS

Embodiment 1

Figure 1:
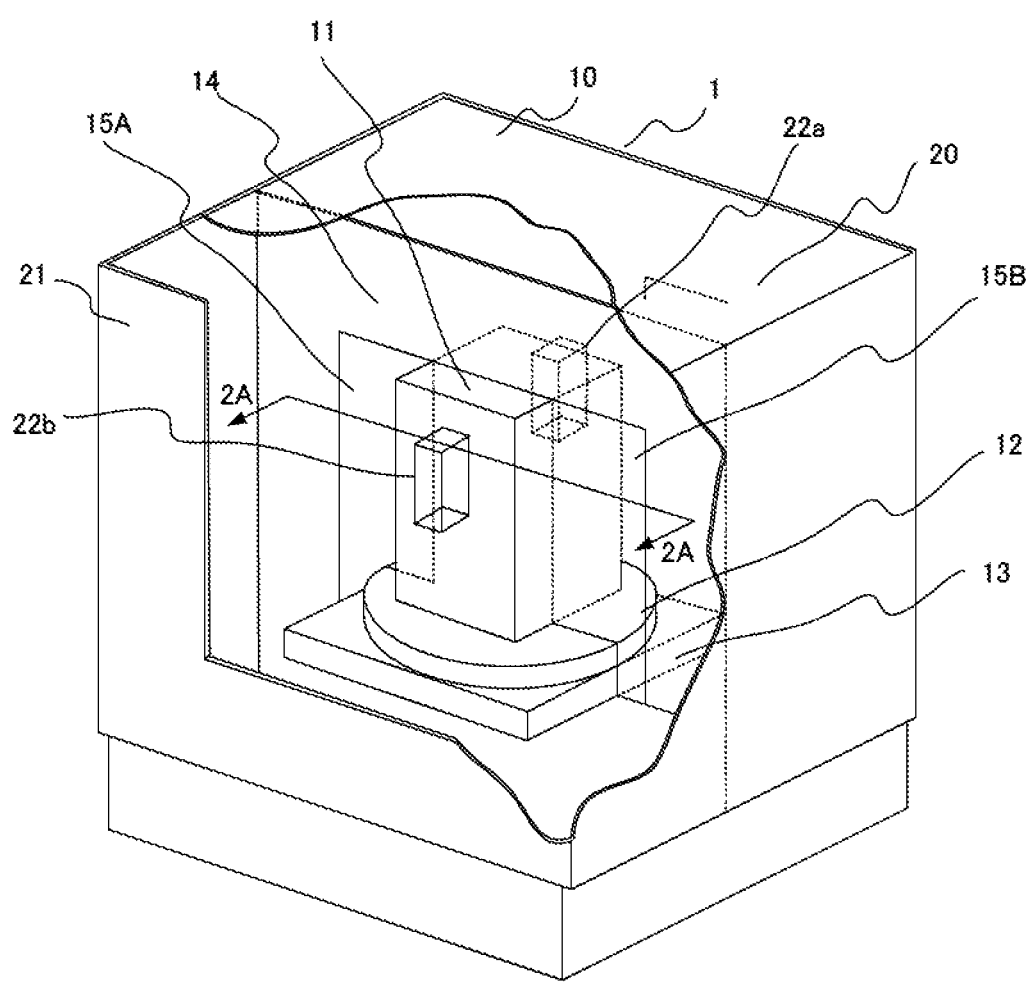
FIG. 1 is a diagram illustrating a machining center of Embodiment 1 of the present invention.
Figure 2A:
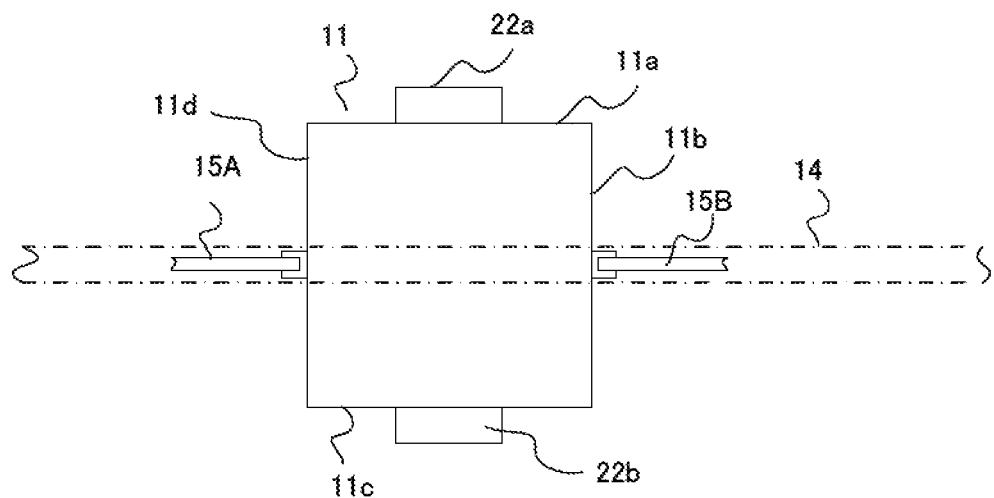
FIG. 2A is a diagram of a state where a shutter door of Embodiment 1 of the present invention is closed.
Figure 2B:
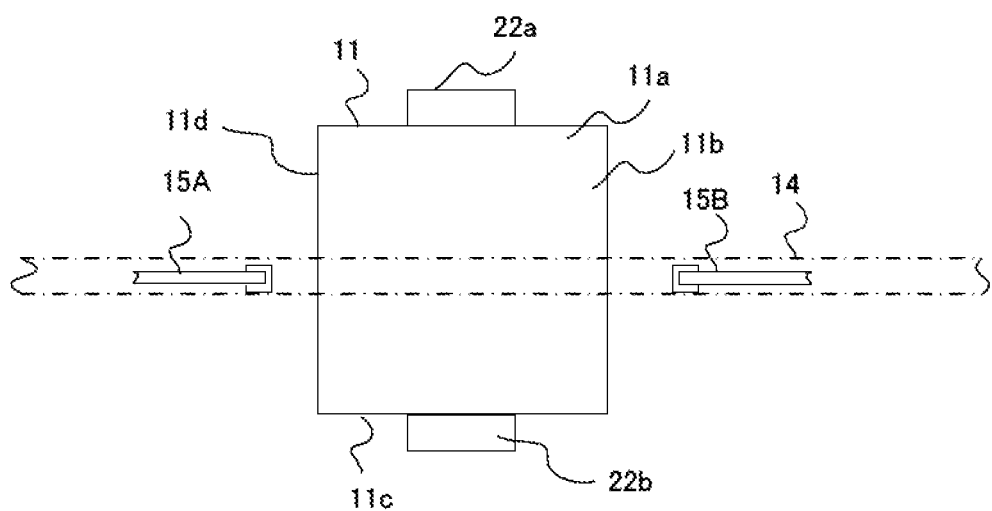
FIG. 2B is a diagram of a state where the shutter door of Embodiment 1 of the present invention is opened.

Referring to FIG. 1, and FIG. 2A and FIG. 2B, the configuration of a present invention machining center 1 will be described. FIG. 1 is a diagram illustrating the inside of the machining center 1, which is Embodiment 1 of the present invention. FIG. 2A is an enlarged view of cross-section 2A—cross-section 2A of FIG. 1, and is a diagram of an equerre 11 seen from the upper side the machining center 1. FIG. 2B is a diagram of a state where a shutter door of FIG. 2A is opened.

The machining center 1, which is a machine tool, is surrounded by wall surfaces 21. The inside of the machining center 1 is divided by a partition 14, a processing chamber 10 is defined by cover walls formed by the partition 14 and the wall surfaces 21, and the processing chamber 10 is isolated from its outside. A spindle 20 is arranged in the processing chamber 10. The processing chamber 10 is isolated from the outside of the machining center 1. A fixed base 13 is arranged inside the processing chamber 10. An index table 12, which can be rotated and positioned about an axis in the vertical direction with respect to the fixed base 13, is arranged on the fixed base 13. An equerre 11 is arranged on the index table 12. A workpiece 22a to be processed is attached to the equerre 11. The equerre 11 is rotatable along the circumference of the axis in the vertical direction of the fixed base 13 according to the rotation of the index table 12. The workpiece 22a is processed by rotating the index table 12, so that the workpiece 22a attached to the equerre 11 faces the direction of the spindle 20. The partition 14 is attached so as to stride over the equene 11 from the sides of the equerre 11 to the upper side of the equerre 11, between the opposing wall surfaces 21 among the wall surfaces 21 to which the spindle 20 is not attached. An opening hole is arranged in the partition 14 at a part of the equerre 11. A shutter door 15A and a shutter door 15B are arranged at either side of the equerre 11 in the opening of the partition 14, so as to sandwich the equerre 11. The shutter door 15A and the shutter door 15B are movable so as to be opened and closed along the partition 14. That is, when the shutter door 15A and the shutter door 15B move toward the equerre 11, and the shutter door 15A and the shutter door 15B contact the equerre 11, the opening of the partition 14 is closed, and when the shutter door 15A and the shutter door 15B move so as to be distant from the equerre 11, and the shutter door 15A and the shutter door 15B are separated from the equerre 11, the opening of the partition 14 is opened. That is, the shutter door 15A and the shutter door 15B are movable in between an open position at which the opening is opened so that the inside of the processing chamber 10 communicates with the outside of the processing chamber 10, and a closed position at which the opening is closed so that the inside of processing chamber 10 is isolated from the outside of the processing chamber 10.

A sealing member is attached to a tip of each of the shutter door 15A and the shutter door 15B that contact the equerre 11 when the opening of the partition 14 is closed. Accordingly, in a state where the opening of the partition 14 is closed by the shutter door 15A and the shutter door 15B, a sealing member is pressed against the equerre to isolate the processing chamber 10 from the outer side. Then, scattering of a liquid coolant to the surroundings of the machining center 50 can be prevented.

In this embodiment, the positions of the partition 14, the shutter door 15A, and the shutter door 15B are arranged on a substantially one virtual surface. In FIG. 2A and FIG. 2B, the position of the partition 14 is indicated by imaginary lines. One surface 11a of the equerre 11 is fully located in the processing chamber 10 with respect to the partition 14, and a surface 11c of the equerre 11 on the opposite side is located on the opposite side of the processing chamber 10 with respect to the partition 14. As for each of the remaining side surfaces 11b and 11d of the equerre 11, a half is located within the processing chamber 10, and the other half is located on the outer side of the processing chamber 10. Each of the surfaces 11a, 11b, 11c, and 11d of the equerre 11 can be moved by rotating the equerre 11 by rotation of the index table 12, in a state where the shutter door 15A and the shutter door 15B are opened.

Subsequently, the operation of the machining center 1 of the present invention will be described. At the time of preparation before processing of the machining center 1, the workpiece 22a to be processed is first attached to one surface 11a of the equerre 11. Then, in a state where the opening is opened by moving the shutter door 15A and the shutter door 15B to the open positions, the position of the equerre 11 is set by actuating the index table 12, so that the workpiece 22a attached to the equerre 11 faces the direction of the spindle 20. Then, the shutter door 15A and the shutter door 15B are moved to the closed positions where the shutter door 15A and the shutter door 15B contact the equerre 11, the processing chamber 10 is isolated from its outer side, and in this state, processing of the workpiece 22a is performed.

In the Middle of processing of the workpiece 22a, a different workpiece 22b to be processed is attached to the surface 11c is of the equerre 11 exposed to the outer side of the processing chamber 10. The setting of the position of the equerre 11 is performed by actuating the index table 12, so that, at the stage where the processing of the workpiece 22a is terminated, the shutter door 15A and the shutter door 15B are moved to the open positions and the opening is opened, and the workpiece 22a attached to the equerre 11 is moved to the outer side of the processing chamber 10. With this operation, the surface 11c to which the workpiece 22b is attached moves to the inside of the processing chamber 10 at the same time. Then, the shutter door 15A and the shutter door 15B are moved to the closed positions where the shutter door 15A and the Shutter door 15B contact the equerre 11, the processing chamber 10 is isolated from its outer side, and in this state, processing of the workpiece 22b is performed. At this time, the orientation of the workpiece 22a is changed and the workpiece 22a is attached to the equerre 11 on the surface 11a moved to the outer side of the processing chamber 10.

Accordingly, during the processing of the workpiece 22a attached to one surface 11a of the equerre 11, preparation of the workpiece 22b attached to the surface 11c of the equerre 11 on the other side of that surface can be performed, and by changing the orientation of the equerre 11 at the time of the completion of processing of the workpiece 22a attached to one surface of the equerre 11, processing of the workpiece 22b attached to the surface 11c of the equerre 11 can be immediately started, and during the processing, preparation of the next processing, such as changing the orientation of the workpiece 22a attached to one surface 11a of the equerre 11, can be performed. Accordingly, the operating rate of the machining center 1 can be increased.

Embodiment 2

Figure 3:
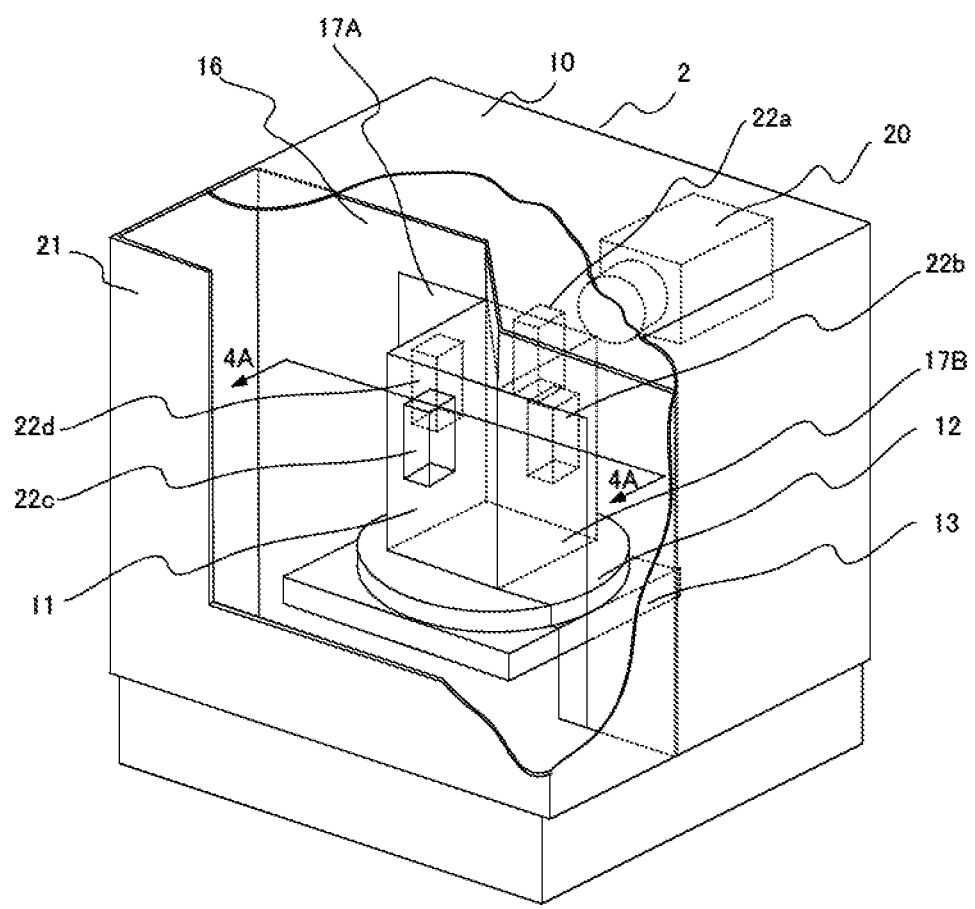
FIG. 3 is a diagram illustrating the machining center of Embodiment 2 of the present Invention.
Figure 4A:
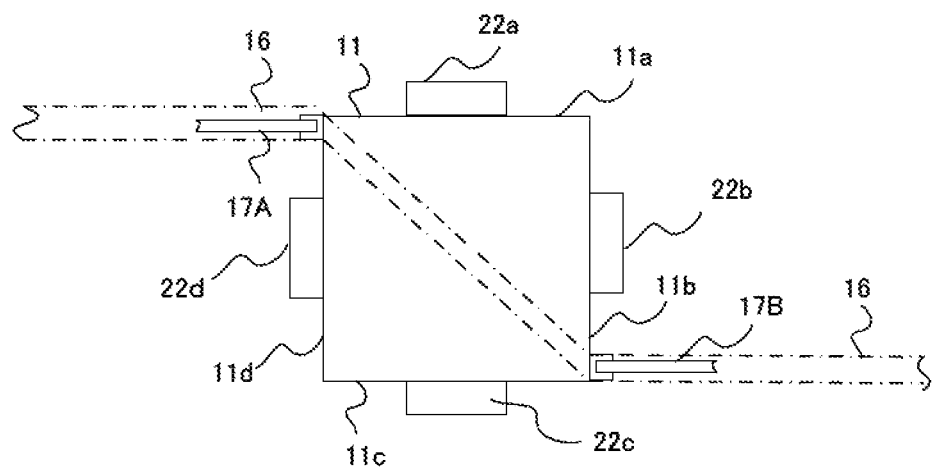
FIG. 4A is a diagram of a state where the shutter door of Embodiment 2 of the present invention is closed.
Figure 4B:
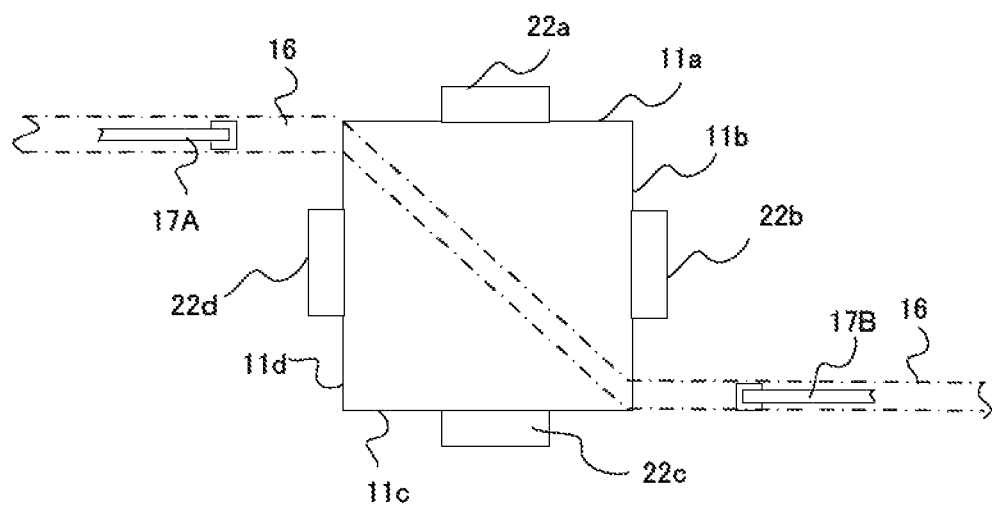
FIG. 4B is a diagram of a state where the shutter door of Embodiment 2 of the present invention is opened.

Referring to FIG. 3, and FIG. 4A to FIG. 4C, the configuration of a machining center 2 as Embodiment 2 of the present invention will be described. FIG. 3 is a diagram illustrating the inside of the machining center 2, which is Embodiment 2 of the present invention. FIG. 4A is an enlarged view of cross-section 4A—cross-section 4A of FIG. 3, and is a diagram of the equerre 11 seen from the upper side of the machining center 2. FIG. 4B is a diagram in a state where the shutter doors in FIG. 4A are opened. The machining center 2, which is a machine tool of this embodiment, has a positional relationship with the shutters different from the positional relationship in Embodiment 1. Here, in Embodiment 2, only the different points from Embodiment 1 will be described. The other parts are the same as those in Embodiment 1.

Embodiment 1 has the flat surface partition 14, and the shutter door 15A and the shutter door 15B are arranged on the one virtual surface substantially the same as the flat surface of the partition 14. That is, in the closed position of the shutter door 15A and the shutter door 15B, the line connecting the contact part between the shutter door 15A and the equerre 11, and the contact part between the shutter door 15B and the equerre 11 is parallel to a surface of the equerre 11, and the shutter door 15B is arranged on a surface parallel to a surface of the equerre 11. Meanwhile, Embodiment 2 is different in that the contact part between the shutter door 15A and the equerre 11, and the contact part between the shutter door 15B and the equerre 11 are in a diagonal positional relationship when seen from the upper side of the equerre 11. Accordingly, in Embodimem 2, a partition 16 is slanted in an upper part of the equerre 11. In FIG. 4A and FIG. 4B, the position, of the partition 16 is indicated by imaginary lines.

The partition 16 is attached to stride over the equerre 11 between two opposing side walls of the wall surfaces 21 to which the spindle 20 is not arranged. A shutter door 17A and a shutter door 17B are attached to the partition 16 on either side of the equerre 11, so that they are located on the opposite sides by sandwiching the equerre 11, respectively. The side of partition 16 to which the shutter door 17A is attached defines and divides the processing chamber 10 from the upper part to the bottom of the machining center 2. On the other hand, the side of the partition 16 to which the shutter door 17B is attached defines and divides the processing chamber 10 from the upper part to the bottom of the machining center 2.

The shutter door 17A and the shutter door 17B are movable along the surface of the partition 16. When the shutter door 17A and the shutter door 17B are moved toward the equerre 11, and the shutter door 17A and the shutter door 17B contact the equerre 11, the openings between the partition 16 and the equerre 11 are closed, and when the shutter door 17A and the shutter door 17B are moved to be separated from the equerre 11, and the shutter door 17A and the shutter door 17B are separated from the equerre 11, the openings between the partition 16 and the equerre 11 are opened. That is, the shutter door 17A and the shutter door 17B are movable between the open positions at which opening of the openings are performed, so that the inside of the processing chamber 10 communicates with the outside of the processing chamber 10, and the closed positions at which closing of the openings is performed, so that the inside of the processing chamber 10 is isolated from the outside of the processing chamber 10.

The part where the shutter door 17A contacts the equerre 11 is close to one corner of the equerre 11, and is the surface 11d opposing to the partition 16, and the part where the shutter door 17B contacts the equerre 11 is close to a corner diagonal to the one corner 11d close to the part where the shutter door 17A contacts the equerre 11, and is the snake 11b opposing to the partition 16. Then, either of the corner portion of equerre 11 close to the part where the shutter door 17A contacts the equerre 11, and the corner portion of equerre 11 close to the part where the shutter door 17B contacts the equerre 11 is a corner on the side close to the spindle 20, and the other is a corner on the side distant from the spindle 20. In FIG. 3, FIG. 4A and FIG. 4B, the corner portion of the equerre 11 close to the part where the shutter door 17A contacts the equerre 11 is the corner on the side close to the spindle 20, and the corner part of the equerre 11 close to the part where the shutter door 17B contacts the equerre 11 is the corner on the side distant from the spindle 20. At this time, the part where the shutter door 17A contacts the equerre 11 may not be the surface 11d opposing to the partition 16, and may be the surface 11a opposing to the spindle. Then, the part where the shutter door 17B contacts the equerre 11 may be the surface 11c on the opposite side of the surface 11a. In this case, not an end face but a side surface of the shutter door 17A contacts the surface 11a of the equerre 11, and a side surface of the shutter door 17B contacts the surface 11c of the equerre 11. Accordingly, in the processing chamber 10, the cover walls are formed by the wall surfaces 21 and the partition 16, and the processing chamber 10 is isolated from the outer side. The other configurations are the same as those in Embodiment 1.

Different from Embodiment 1, in Embodiment 2, when the shutter door 17A and the shutter door 17B are in the closed positions, the two adjacent surfaces, the surface 11a and the surface 11b of the equerre 11, exist in the processing chamber 10, and the other two surfaces, the surface 11c and the surface 11d exist outside the processing chamber 10. Accordingly, the workpiece 22a and the workpiece 22b mounted on the two surfaces, the surface 11a and the surface 11b, respectively, of the equerre 11 in the processing chamber 10 are continuously processed at once, and on this occasion, it is possible to perform processing preparation of a workpiece 22c and a workpiece 22d mounted on the two surfaces, the surface 11c and the surface 11d, located on the outer side of the processing chamber 10. When the processing of the workpiece 22a and the workpiece 22b is terminated, the shutter door 17A and the shutter door 17B are made to be in the open positions, the equerre 11 is rotated by the index table 12, and the surface lie and the surface 11d on which processing preparation of the workpiece 22c and the workpiece 22d is completed are moved to and arranged inside of the processing chamber 10, simultaneously with this, the surface 11a and the surface 11b of the equerre 11 are moved to the outer side of the processing chamber 10. Then, processing of the workpiece 22c and the workpiece 22d can be started by making the shutter door 17A and the shutter door 17B to be in the closed positions. At this time, the workpiece 22a and the workpiece 22b can be removed from the surface 11a and the surface 11b of the equerre 11 moved to the outer side of the processing chamber 10, and the next processing preparation, such as changing to the next workpiece to be processed, can be performed. Especially, in Embodiment 2, since two surfaces of the four surfaces of the equerre 11 can be arranged inside the processing chamber 10, and the remaining two surfaces can be arranged outside the processing chamber 10, when performing adjustment of the orientation of the equerre 11 once, the front surface of the workpiece 22a and a side surface of the workpiece 22 on the two surfaces of the equerre 11 can be processed.

Figure 4C:
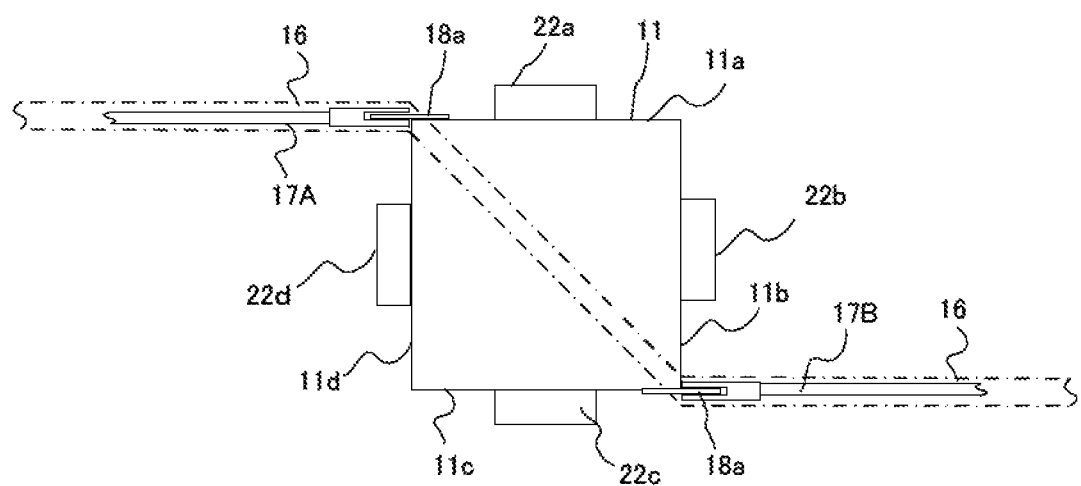
FIG. 4C is a diagram of a state where the shutter door of Embodiment 2 of the present invention is closed, and illustrates a different sealing method.

Additionally, in FIG. 4A and FIG. 4B, similar to Embodiment 1, sealing is achieved by attaching a sealing member to a tip of each of the shutter door 17A and the shutter door 17B, and pressing the sealing members of the shutter door 17A and the shutter door 17B against the equerre 11. However, another method as illustrated in FIG. 4C is also conceivable. FIG. 4C is a diagram corresponding to FIG. 4A, and is a diagram of the equerre 11 seen from the upper side of the machining center 2. Fin members 18a are attached to the equerre 11 at the parts where the tips of the shutter door 17A and the shutter door 17B contact, when the shutter door 17A and the shutter door 17B are closed. Typically, the fin members 18a are fixed to surfaces of the equerre 11, and extend toward the shutter door 17A and the shutter door 17B from edge portions from the upper part to the lower part of the equerre 11. The tip of each of the shutter door 17A and the shutter door 17B has a shape that can internally receive and engage with the fin member 18a. Accordingly, when the shutter door 17A and the shutter door 17B are closed, a gap between the shutter door 17A or the shutter door 17B and the equerre 11 is eliminated, and sealing can be achieved.

Embodiment 3

Figure 5:
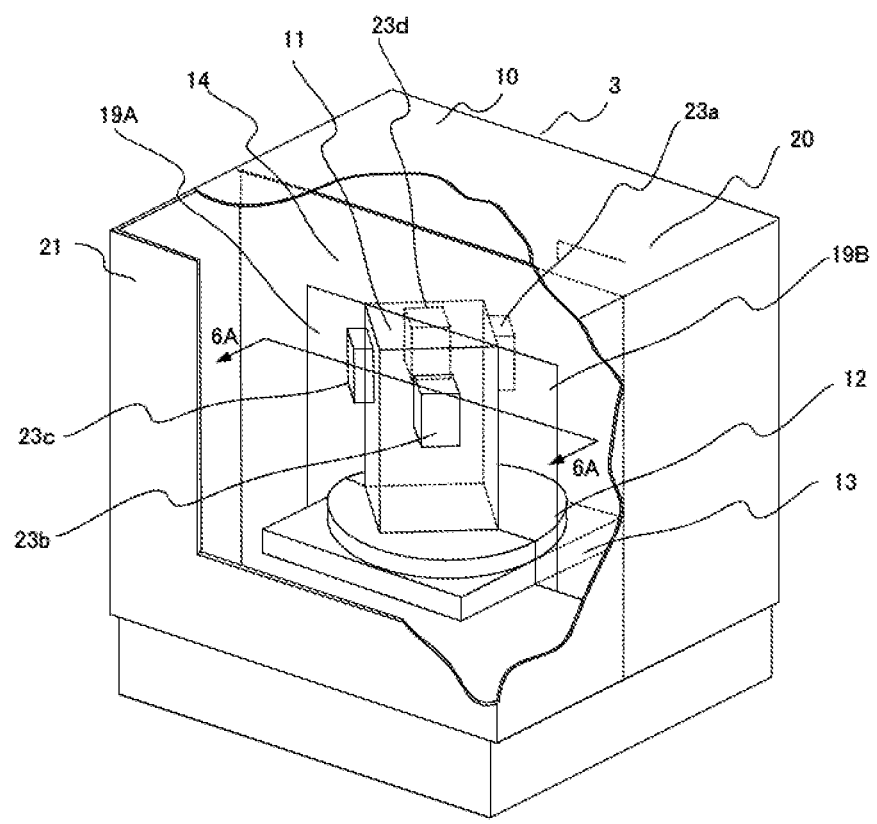
FIG. 5 is a diagram illustrating the machining center of Embodiment 3 of the present invention.
Figure 6A:
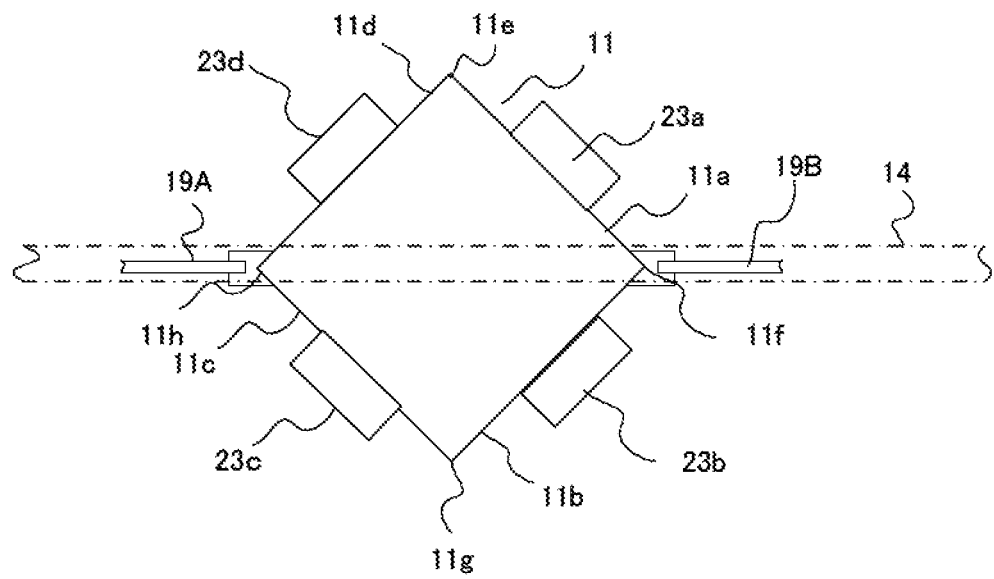
FIG. 6A is a diagram of a state where the shutter door of Embodiment 3 of the present invention is closed.
Figure 6B:
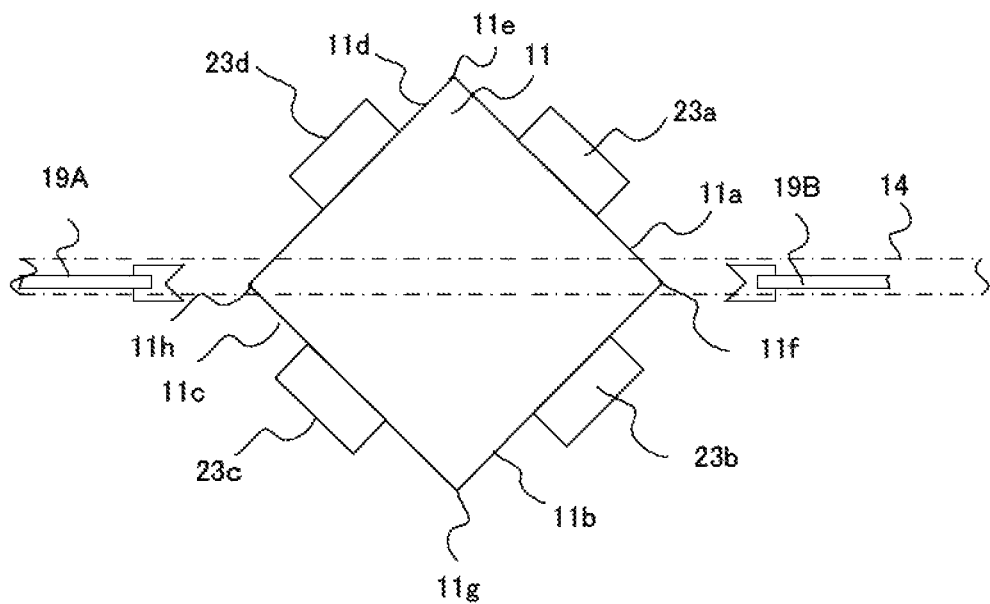
FIG. 6B is a diagram of a state where the shutter door of Embodiment 3 of the present invention is opened.

Referring to FIG. 5, and FIG. 6A and FIG. 6B, the configuration of a machining center 3 as Embodiment 3 of the present invention will be described. FIG. 5 is a diagram illustrating the inside of the machining center 3, which is Embodiment 3 of the present invention. FIG. 6A is an enlarged view of cross-section 6A—cross-section 6A of FIG. 5, and is a diagram of the equerre 11 seen from the upper side of the machining center 3. FIG. 6B is a diagram in a state where the shutter doors in FIG. 6A are opened. The machining center 2, which is a machine tool of this embodiment, has a positional relationship with the equerre 11 in the closed positions of the shutters different from the positional relationship in Embodiment 1. Here, in Embodiment 3, only the different points from Embodiment 1 will be described. The other parts are the same as those in Embodiment 1.

Similar to Embodiment 1, Embodiment 3 also has one partition 14 and a shutter door 19A and a shutter door 19A are arranged on a virtual surface substantially the same as the partition 14. The difference from Embodiment 1 is that the shutter door 19A and the shutter door 19B contact a corner portion 11f and a corner portion 11g on two diagonal positions of the equerre 11 in their closed positions, respectively. That is, in Embodiment 3, different from Embodiments 1 and 2, each surface of the equerre 11 is shifted 45 degrees. Sealants capable of sealing by contacting a corner portion are arranged on the shutter door 19A and the shutter door 19B at the parts where the shutter door 19A and the shutter door 19B contact the equerre 11. The other configurations are the same as those in Embodiment 1.

Different from Embodiment 1, in Embodiment 3, When the shutter door 19A and the shutter door 19B are in the closed positions, two adjacent surfaces of the equerre 11, the surface 11a and the surface 11d, exist in the processing chamber 10, and the other two surfaces, the surface 11b and the surface 11c, exist outside the processing chamber 10. Accordingly, a workpiece 23a and a workpiece 23d mounted on the two surfaces, the surface 11a and the surface 11d, respectively, of the equerre 11 in the processing chamber 10 are continuously processed at once, and on this occasion, it is possible to perform processing preparation of a workpiece 23b and a workpiece 23c mounted on the two surfaces, the surface 11b and the surface 11c, located on the outer side of the processing chamber 10. When the processing of the workpiece 22a is terminated, the shutter door 19A and the shutter door 19B are made to be in the open positions, the equerre 11 is rotated by the index table 12, and the surface 11b and the surface 11c on which preparation for processing of the workpiece 23b and the workpiece 23c is completed are arranged inside of the processing chamber 10, simultaneously, the surface 11a and the surface 11d of the equerre 11 are moved to the outer side of the processing chamber 10.

Then, the shutter door 19A and the shutter door 19B are made to be in the closed positions, and processing of the workpiece 23b and the workpiece 23c can be started. At this time, in the surface 11a and the surface 11d of the equerre 11 moved to the outer side of the processing chamber 10, the next processing preparation, such as changing to the next workpiece, can be performed.

Similar to Embodiment 2, at the time of processing. Embodiment 3 can arrange two surfaces of the equerre 11 in the processing chamber 10, and can arrange two surfaces of the equerre 11 outside the processing chamber 10 at once. However, in Embodiment 3, the setting of the coordinate axis of processing of the spindle 20 becomes more complicated than that in Embodiment 2, since the angle of a surface of the equerre 11 is slanted with respect to the spindle 20.

Figure 6C:
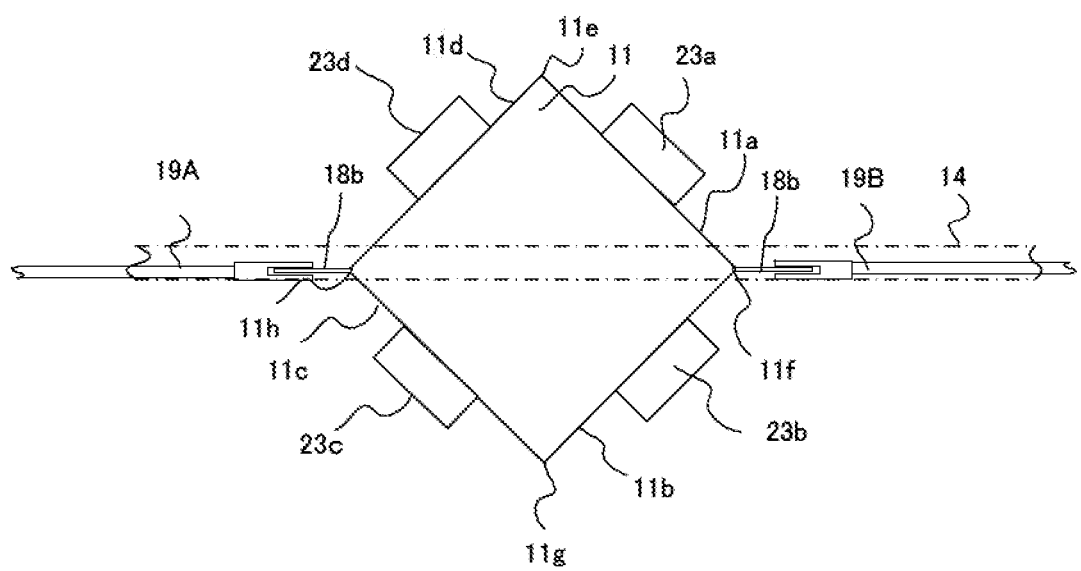
FIG. 6C is a diagram illustrating a state where the shutter door of Embodiment 3 of the present invention is closed, and illustrates a different sealing method.

Additionally, in FIG. 6A and FIG. 6B, similar to Embodiment 1, sealing is achieved by attaching a sealing member to a tip of each of the shutter door 19A and the shutter door 19B, and pressing the sealing members of the shutter door 19A and the shutter door 19B against the corner portions of the equerre 11. However, another method as illustrated in FIG. 6C is also conceivable. FIG. 6C is a diagram corresponding to FIG. 6A, and is a diagram of the equerre 11 seen from the upper side of the machining center 2. The fin members 18b are attached to the corner portions of the equerre 11 where the tips of the shutter door 19A and the shutter door 19B contact, when the shutter door 19A and the shutter door 19B are closed, so that the fin members 18b project in the direction of a half angle of the external angle of the equerre 11 from the corner portions. Similar to the case of Embodiment 2, typically, the fin members 18b are fixed to the surface of the equerre 11, and extend toward the shutter door 19A and the shutter door 19B from the edge portions from the upper part to the lower part of the equerre 11. The tip of each of the shutter door 19A and the shutter door 19B can internally receive and engage with the fin member 18b. Accordingly, when the shutter door 19A and the shutter door 19B are closed, a gap between the shutter door 19A or the shutter door 19B and the equerre 11 is eliminated, and sealing can be achieved.

Embodiment 4

Figure 7A:
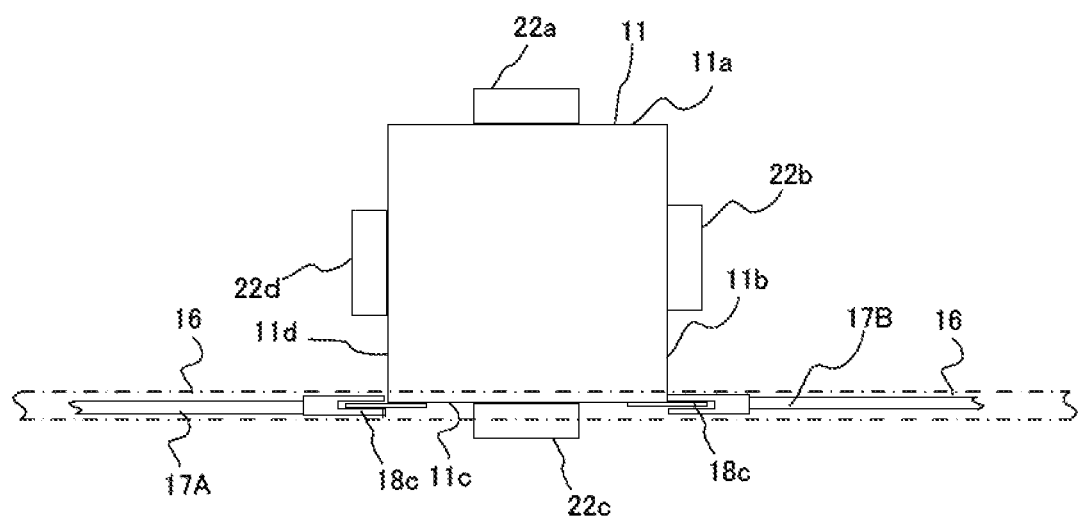
FIG. 7A is a diagram of a state where the shutter door of Embodiment 4 of the present invention is closed.
Figure 7B:
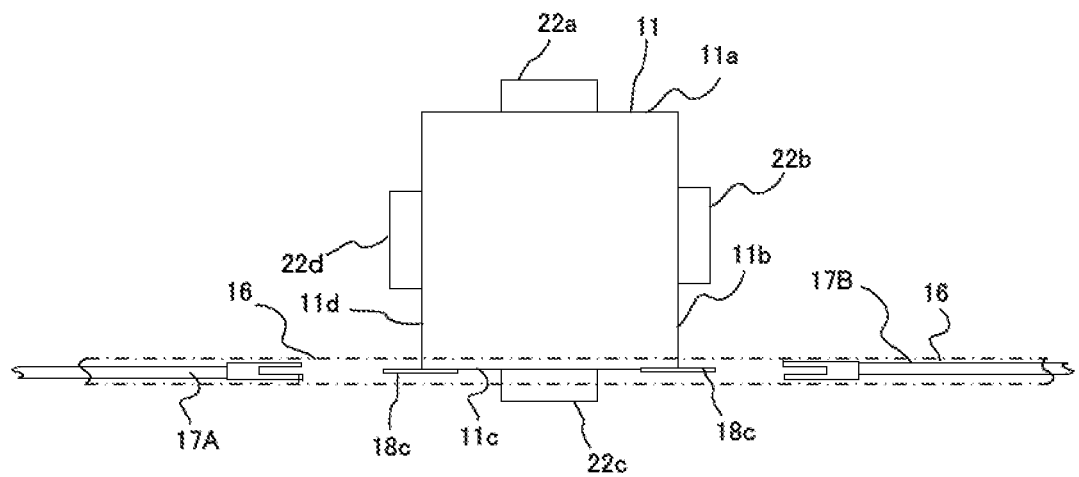
FIG. 7B is a diagram of a state where the shutter door of Embodiment 4 of the present invention is opened.
Figure 7C:
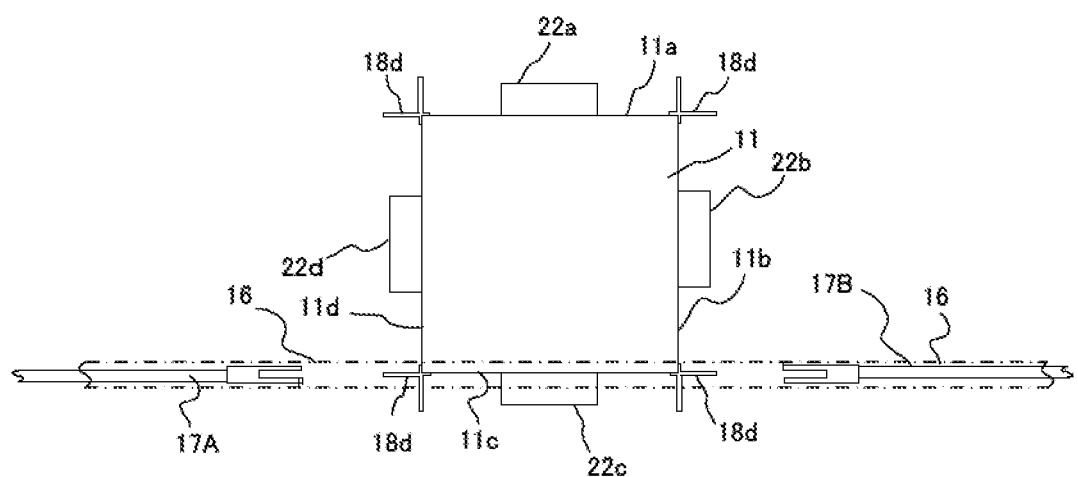
FIG. 7C is a diagram illustrating a state where the shutter door of Embodiment 4 of the present invention is, closed, and illustrates a different sealing method.
Figure 8:
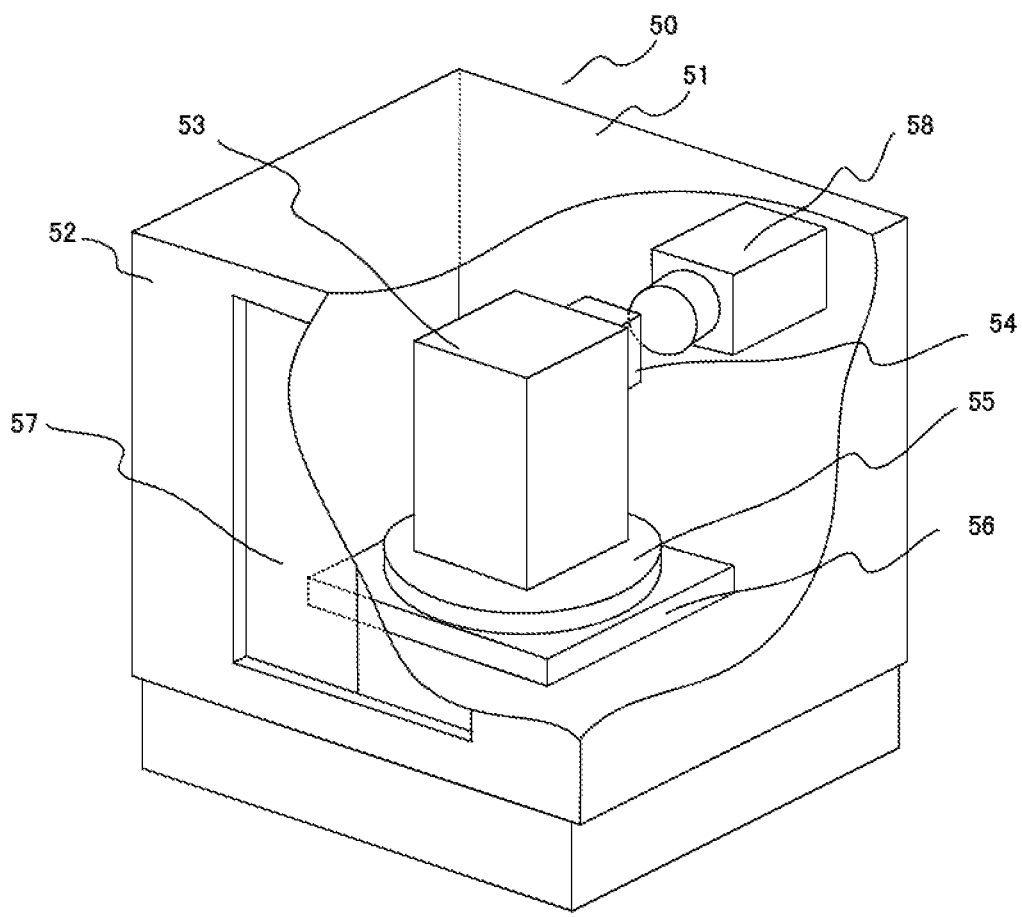
FIG. 8 is a diagram illustrating a conventional machining center.

Referring to FIG. 7C, Embodiment 4 of the present invention will be described. FIG. 7A to FIG. 7B are diagrams corresponding to FIG. 2A and FIG. 2B, and are diagram of the equerre 11 seen from the upper side of the machining center. FIG. 7B is a diagram in a state where the shutter doors in FIG. 7A are opened. In Embodiment 1, the shutter doors in the closed positions of the shutters were in center portions of the two opposing surfaces of the equerre 11. In Embodiment 2, the shutter doors in the closed positions of the shutters were close to the corners located in the diagonal corners of the equerre 11. Meanwhile, in the machining center, which is a machine tool of this embodiment, fin members 18c are attached to either side of one surface of the equerre 11, so as to extend toward the outer side of the one surface along the one surface. The partition 16 is arranged to define the processing chamber 10 along the one surface, so that the one surface serves as a boundary. The fin members 18c extend toward the shutter door 17A and the shutter door 17B from edge portions of either side of the one surface from the upper part to the lower part of the equerre 11. The tip of each of the shutter door 17A and the shutter door 17B has a shape that can internally receive and engage with the fin member 18a. Accordingly, when the shutter door 17A and the shutter door 17B are closed, a gap between the shutter door 17A or the shutter door 17B and the equerre 11 is eliminated, and sealing can be achieved. In Embodiment 4, especially, since three surfaces of the four surfaces of the equerre 11 can be arranged in the processing chamber 10, and the remaining one surface can be arranged outside the processing chamber 10, when performing adjustment of the orientation of the equerre 11 once, the front surface of the workpiece 22a and the side surfaces of the workpiece 22b and the workpiece 22d on the three surfaces of the equerre 11 can be processed.

In this embodiment, as in FIG. 7C, fin members 18d are arranged in all the corners of the equerre 11 along the two surfaces defining respective corners. That is, two fin members 18d are arranged on either side of the surface 11a so as to extend from the edges of either side of the surface 11a. Similarly, two fin members 18d are arranged on either side of the surface 11b so as to extend from the edges of either side of the surface 11b. The same applies to the surface 11c and the surface 11d. Accordingly, three surfaces of the four surfaces of the equerre 11 have been able to be arranged in the processing chamber 10, and the remaining one surface has been able to be arranged outside the processing chamber 10, and all the surfaces of the equerre 11 can be arbitrarily arranged to the processing chamber 10 or outside the working chamber 11.

REFERENCE SIGNS LIST 1, 2, 3 machining center
10 processing chamber
11 equerre
14, 16 partition
15A, 15B shutter door
17A, 17B shutter door
19A, 19B shutter door
20 spindle

The invention claimed is:

1. A machine tool comprising:
a front cover wall having an access opening, a back cover wall, two side cover walls extending between the front cover wall and the back cover wall;
a partition wall extending between a midpoint of the two side cover walls;
a processing chamber comprising an inside of a processing chamber area and an outside of a processing chamber area;
the inside of the processing chamber area being located between the back cover wall and the partition wall and the outside of the processing chamber area being located between the partition wall and the front cover wall;
a workpiece mount for fixing a workpiece, wherein a part of the workpiece mount including at least one surface of the workpiece mount is arranged inside of the processing chamber;
an opening arranged in a part of the partition wall for access to the inside of the processing chamber area from the access opening through the opening; and
the partition wall comprising shutter doors movable between open positions where opening of the opening is performed so that the inside of the processing chamber area communicates with the outside of the processing chamber area, and closed positions where closing of the opening is performed so that the inside of the processing chamber area is isolated from the outside of the processing chamber area,
wherein a part of the workpiece mount projects from the opening to the outside of the processing chamber area, and the closing is achieved by complete contact of the shutter doors with the workpiece mount in the closed positions, and
wherein the part of the workpiece mount is located at the inside of the processing chamber area in the closed positions of the shutter doors, and an other part of the workpiece mount other than the part of the workpiece mount located at the inside of the processing chamber area is located at the outside of the processing chamber area.

2. The machine tool according to claim 1, wherein the shutter doors include sealing members in parts where the contact with the workpiece mount is made, and the complete contact is achieved by the contact between the sealing members and the workpiece mount.

3. The machine tool according to claim 2, wherein the part of the workpiece mount is one surface or two surfaces of the workpiece mount.

4. The machine tool according to claim 1, wherein the shutter doors are tabular members having a certain thickness, and the complete contact is achieved so that tabular members contact surfaces of the workpiece mount.

5. The machine tool according to claim 4, wherein the part of the workpiece mount is one surface or two surfaces of the workpiece mount.

6. The machine tool according to claim 1, wherein the shutter doors are tabular members having a certain thickness, and the complete contact is achieved so that tabular members contact corner portions of the workpiece mount.

7. The machine tool according to claim 1, wherein the workpiece mount includes fin members, the shutter doors can receive the fin members in the closed positions, and the complete contact is achieved by receiving the fin members by the shutter doors.

8. The machine tool according to claim 1, wherein the part of the workpiece mount is one surface or two surfaces of the workpiece mount.

* * * * *